United States Patent
Melle

(10) Patent No.: US 12,023,691 B2
(45) Date of Patent: Jul. 2, 2024

(54) FLUID SWITCHING VALVE WITH PRESSURE DIFFERENCE SUBJECTABLE VALVE CLOSURE BODIES

(71) Applicant: Hansgrohe SE, Schiltach (DE)

(72) Inventor: Fabian Melle, Durbach (DE)

(73) Assignee: Hansgrohe SE, Schiltach (DE)

( * ) Notice: Subject to any disclaimer, the term of this patent is extended or adjusted under 35 U.S.C. 154(b) by 0 days.

(21) Appl. No.: 18/104,560

(22) Filed: Feb. 1, 2023

(65) Prior Publication Data
US 2023/0241631 A1  Aug. 3, 2023

(30) Foreign Application Priority Data
Feb. 2, 2022  (DE) .......................... 102022201110.4

(51) Int. Cl.
*F16K 31/44*   (2006.01)
*B05B 1/16*    (2006.01)

(52) U.S. Cl.
CPC ............ *B05B 1/1627* (2013.01); *F16K 31/44* (2013.01)

(58) Field of Classification Search
CPC ... F16K 11/14; F16K 11/165; F16K 31/52416
See application file for complete search history.

(56) References Cited

U.S. PATENT DOCUMENTS 1,121,879 A * 12/1914 Speakman ............ F16K 11/165
                                                137/630.17
1,501,158 A *  7/1924 Xardell ................. F16K 11/165
                                                     251/255

(Continued)

FOREIGN PATENT DOCUMENTS

CH    680143 A5    6/1992
DE    10046977 A1  5/2002

(Continued)

OTHER PUBLICATIONS

European Patent Office, Search Report dated Jun. 30, 2023 for European Patent Application No. EP23152139, 8 pages.

(Continued)

*Primary Examiner* — Umashankar Venkatesan
(74) *Attorney, Agent, or Firm* — Bose McKinney & Evans LLP

(57) ABSTRACT

A fluid switching valve comprising a valve housing, an inlet area, a first outlet and a second outlet out of the valve housing, a first fluid connection, a second fluid connection, a counter pressure chamber, a first valve unit, a second valve unit and a user-operable switching body for switching the valve closure bodies between their closed position and their open position. Here, the counter pressure chamber is fluid-connected through an inlet link duct to the inlet area. The valve units each have a valve closure body, which is movable between a closed position and an open position for the respective fluid connection and is arranged so as to be subjectable to fluid pressure on the one hand via the inlet area and on the other hand via the counter pressure chamber. The switching body is switchable between different operating positions by a switching movement. The counter pressure chamber is fluid-connected through a first blockable outlet link duct to the first outlet, and through a second blockable outlet link duct to the second outlet.

21 Claims, 2 Drawing Sheets

(56) References Cited

U.S. PATENT DOCUMENTS

| | | | |
|---|---|---|---|
| 1,606,232 A * | 11/1926 | Jentsch | F16K 11/165 137/630.16 |
| 5,107,894 A | 4/1992 | Hochstrasser | |
| 8,397,758 B2 | 3/2013 | Hillesheim et al. | |
| 8,474,482 B2 * | 7/2013 | Melle | F16K 31/563 137/625.13 |
| 10,265,709 B2 | 4/2019 | Lin | |
| 11,560,951 B2 * | 1/2023 | Wang | F16K 31/52491 |
| 2015/0238984 A1 * | 8/2015 | Lee | B05B 1/169 239/447 |
| 2015/0377377 A1 | 12/2015 | Kainuma et al. | |
| 2017/0108129 A1 | 4/2017 | Brenner et al. | |
| 2023/0098030 A1 | 3/2023 | Liu et al. | |

FOREIGN PATENT DOCUMENTS

| | | |
|---|---|---|
| DE | 10325177 A1 | 1/2005 |
| DE | 102014207393 A1 | 10/2015 |
| DE | 102018121773 A1 | 3/2020 |
| DE | 102019123536 A1 | 3/2021 |
| EP | 3147029 A2 | 3/2017 |
| WO | 2021037421 A1 | 3/2021 |
| WO | 2021239051 A1 | 12/2021 |

OTHER PUBLICATIONS

German Search Report dated Oct. 24, 2022 for German Patent Application No. DE102022201110.4, 6 pages.

* cited by examiner

FLUID SWITCHING VALVE WITH PRESSURE DIFFERENCE SUBJECTABLE VALVE CLOSURE BODIES

CROSS-REFERENCE TO RELATED APPLICATION

This application claims priority to German Patent Application No. DE 10 2022 201 110.4, filed on Feb. 2, 2022, the disclosure of which is expressly incorporated herein by reference.

BACKGROUND AND SUMMARY OF THE DISCLOSURE

The invention relates to a fluid switching valve, the valve comprising a valve housing, an inlet area having an inlet into the valve housing, a first and a second outlet out of the valve housing, a first fluid connection from the inlet area to the first outlet, a second fluid connection from the inlet area to the second outlet, a counter pressure chamber, a first valve unit comprising a first valve closure body, a second valve unit comprising a second valve closure body, and a user-operable switching body for switching the valve closure bodies between their closed position and their open position. The counter pressure chamber is fluid-connected to the inlet area through an inlet link duct. The first valve closure body is movable between a closed position and an open position for the first fluid connection and is arranged so as to be subjectable to fluid pressure on the one hand via the inlet area and on the other hand via the counter pressure chamber. The second valve closure body is movable between a closed position and an open position for the second fluid connection and is arranged so as to be subjectable to fluid pressure on the one hand via the inlet area and on the other hand via the counter pressure chamber. In other words, the valve closure bodies are subjectable to a pressure difference in that they are subjected to the pressure difference between the fluid in the inlet area on the one hand and the fluid in the counter pressure chamber on the other hand. The switching body can be switched between different operating positions using a switching motion.

Fluid switching valves of this kind are used for controllably providing an in-fed fluid to either the first or the second outlet where it then exits. The fluid can be generally identified in the present case as a liquid or a gas or vapor. For example, in sanitary technology, such fluid switching valves are used as sanitary fluid switching valves for feeding the in-fed fluid, in this case typically water, optionally to a first point of use via the first outlet, for example to a bathtub outlet, or via the second outlet to a second point of use, for example a bathtub hand-held shower head. Also, such sanitary fluid switching valves in shower heads or kitchen sprays designed for many types of spray head jet types are used to feed the spray fluid, which again is typically water, selectively to a fluid route for a first type of spray jet or to a fluid route for a second type of spray jet. If in addition, a blocking function is required, a corresponding blocking valve device can be associated with the fluid switching valve, for example upstream of the inlet or downstream of the first and/or the second outlet or integrated into the valve housing of the fluid switching valve.

In conventional sanitary fluid switching valves, the switching forces are often very dependent on the fluid pressure acting on the relevant switching components of the valve, in particular on the valve closure bodies, causing the feel of the valve switching or the switching force to be applied by the user to noticeably change depending on the current fluid pressure. In the generic fluid switching valves of the type mentioned at the outset, this can be alleviated using the effect of a pressure difference on the valve closure bodies. Also, conventional sanitary fluid switching valves having switching behavior that is fluid pressure-dependent usually require a relatively long axial stroke length for the valve closure bodies or for a user-actuated switching body acting on them, the stroke length typically being more than 3 mm.

A fluid switching valve of the type mentioned at the outset is disclosed in laid-open publication WO 2021/037421 A1 as a built-in part in a shower head for a sanitary fitting. The fluid switching valve disclosed therein comprises a plurality of diaphragm valves, each having a diaphragm and a counter pressure chamber, the counter pressure chambers being connected to the inlet area in parallel. The diaphragm valves are held in their closed positions by the fluid pressure or dynamic pressure in the counter pressure chambers and are controlled using a user-actuatable rotatable pin controller having a control channel in the form of an axial groove through which the counter pressure chambers can be connected to the respective outlet, bypassing the diaphragms in the process. Depending on the rotational position of the pin, a relief of fluid pressure of one of the counter pressure chambers, and consequently the opening of the associated diaphragm valve, can be effected via the control channel while the remaining diaphragm valves stay closed.

Another conventional fluid switching valve having a plurality of outlets and valve closure bodies with associated counter pressure chambers is disclosed in laid-open publication EP 3 147 029 A2 in which the fluid feed to the counter pressure chambers is controlled using an electromagnet which can be actuated by the user.

It is an object of the invention is to provide a fluid switching valve which offers advantages over the prior art mentioned above, in particular with regard to functionality, design, and/or operational reliability.

The invention achieves this and other objects by providing a fluid switching valve having specific novel and inventive features. Advantageous further developments of the invention are indicated in the dependent claims.

The fluid switching valve according to an illustrative embodiment includes a valve housing, an inlet area having an inlet into the valve housing, a first and a second outlet out of the valve housing, a first fluid connection from the inlet area to the first outlet and a second fluid connection from the inlet area to the second outlet, a counter pressure chamber, which is fluid-connected through an inlet link duct to the inlet area, a first valve unit comprising a first valve closure body which is movable between a closed position and an open position for the first fluid connection, and is arranged so as to be subjectable to fluid pressure on the one hand via the inlet area and on the other hand via the counter pressure chamber, a second valve unit comprising a second valve closure body which is movable between a closed position and an open position for the second fluid connection, and is arranged so as to be subjectable to fluid pressure on the one hand via the inlet area and on the other hand via the counter pressure chamber, and a user-operable switching body for switching the valve closure bodies between their closed position and their open position, the switching body being switchable between different operating positions by a switching movement.

The counter pressure chamber is fluid-connected through a first blockable outlet link duct to the first outlet, and through a second blockable outlet link duct to the second outlet.

The counter pressure chamber is fluid-connected to the first outlet via a first outlet link duct and to the second outlet via a second outlet link duct. The user-actuatable switching body in a first operating position releases the first valve closure body and holds the second valve closure body in its closed position, and in a second operating position the switching body holds the first valve closure body in its closed position and releases the second valve closure body.

This special valve design makes it possible for this fluid switching valve to provide advantages over conventional fluid switching valves with regard to functionality, design and/or operational reliability. For example, this valve can be implemented using only one counter pressure chamber, and can thus be of a correspondingly compact design, if necessary. In addition, it can be easily implemented in such a way that the actuating force to be applied by the user can be kept reasonably low, the actuating force also not being dependent on any fluid pressure in effect, or in any case almost so. The respective outlet link duct can rapidly drop the fluid pressure in effect in the counter pressure chamber when the switching body is actuated. In the valve according to the invention, it is the switching body itself which holds the valve closure bodies in their closed position, such that it is not necessary to hold the valve closure bodies in their closed position by fluid pressure, or at least not solely by fluid pressure, the fluid pressure being a potential aid in this regard depending on the design. This contributes to a reasonably high degree of operational reliability of the valve.

Of course, the fluid switching valve according to the disclosure can have exactly two or more than two outlets out of the valve housing, depending on requirements and the particular case, and thus exactly two or more than two fluid connections and valve units, and is suitable in particular as a sanitary fluid switching valve in sanitary technology, but is also useful in other fields in which there is a need for a fluid switching valve having such fluid routing characteristics.

In a further development of the disclosure, the switching motion of the switching body involves an axial motion and a rotary motion about its axis of axial motion. This represents an advantageous implementation for the desired switching motion of the switching body. In an embodiment having functional and design advantages, the axial motion and the rotary motion are at least sometimes superimposed, for example as a combined axial lifting and rotary motion and/or a combined axial lowering and rotary motion, and in alternative embodiments the axial motion and the rotary motion occur temporally one after the other. In other alternative embodiments, the switching motion of the switching body is a pure rotary motion, for example.

In a further development of the disclosure, the switching body can be further switched cyclically from one to a next of the different operating positions using a forward switching arrangement. Cyclical forward switching means that the switching body always moves continuously in the same direction when re-actuated, assuming its different operating positions cyclically one after the other. This is an advantageous implementation with regard to function and design for switching the switching body between its different operating positions. In alternative embodiments, the switching motion of the switching body between the different operating positions can occur in another way, for example directly from a current operating position to any desired next operating position and/or electively in two opposite directions, for example clockwise and counterclockwise.

In a further development of the disclosure, the switching body blocks off the second outlet link duct in the first operating position and/or blocks off the first outlet link duct in the second operating position. This is an advantageous use of the switching body with regard to function and design, not only for holding the respective valve closure body in its closed position, but also for blocking the first or the second outlet link duct. In alternative embodiments, instead of the switching body blocking the first and/or the second outlet link duct, a separate blocking element does so.

In a further development of the disclosure, the different operating positions correspond to different rotational angle positions of the switching body. This is a beneficial implementation of the different operating positions for many applications. In alternate embodiments, the different operating positions correspond to different axial positions of the switching body, for example.

In a further development of the disclosure, the counter pressure chamber is designed as a single part. In this case, the first and the second valve unit are subjectable to fluid pressure via the one-piece, common counter pressure chamber. This is an advantageous design implementation with regard to the desired function of the counter pressure chamber and the valve units. In alternative embodiments, the counter pressure chamber is made in multiple parts so that it comprises a plurality of individual chambers associated individually with each of the valve units, respectively.

In one embodiment of the disclosure, the switching body comprises a switching member which is located movably within the one-piece counter pressure chamber, the switching member acting on the first and the second valve closure body. This is an advantageous implementation with regard to function and design for the switching body. In alternative embodiments, the switching body comprises a switching member which is movably located outside the counter pressure chamber or comprises a plurality of switching members inside the counter pressure chamber, each of which is associated with one of the valve closure bodies.

In a further embodiment of the disclosure, the switching member in the one-piece counter pressure chamber contains an axially and rotationally movable switching disk which assumes different rotary positions in the different operating positions, and which acts axially on the valve closure bodies. This is an advantageous implementation with regard to function and design for the switching member. In the process, the axially and rotationally movable switching disk can be designed in the form of a circle sector or a polygon or another form adapted to the arrangement of the valve closure bodies. In alternative embodiments, the switching member can be designed as a purely axially movable or as a tiltingly-movable switching member.

In a further development of the disclosure, the first outlet link duct is provided in the first valve closure body, and/or the second outlet link duct is provided in the second valve closure body. This is an advantageous implementation with regard to function and design for the outlet link ducts and for the valve closure bodies. In alternative embodiments, the respective outlet link duct is provided outside the valve closure body, for example next to the valve closure body.

In a further development of the disclosure, the first and/or the second valve closure body is guided axially movably in a receptacle or is held axially movably by a holding membrane. This is an advantageous implementation with regard to function and design for the arrangement of the valve closure bodies. In the process, in advantageous embodiments, the axial movement of the respective valve closure body is parallel to the axial movement of the switching body, and in alternative embodiments is non-parallel thereto. In alternative embodiments, the valve closure bodies are arranged rotationally movably or are rigidly connected to the switching body or to the switching member.

In a further development of the disclosure, the first and/or the second valve closure body is bounded axially in its open position by a stop. In this way, the respective stop thus limits the axial opening motion of the respective valve closure body in a defined way. This is also an advantageous measure with regard to function and design for the valve closure bodies. In alternative embodiments, the open position of the first and/or the second valve closure body is not defined by a stop, but rather is limited by an end position of a holder which holds the respective valve closure body, such as a holding membrane.

In a further development of the disclosure, the first and/or the second valve closure body is subjected to a spring force and/or a weight force in the direction of its closed position. Subjection to a spring force in this context means that a spring force, for example from a compression or a tension spring or from some other elastic element, acts directly or indirectly, for example via the switching body, on the respective valve closure body in the direction of its closed position. Subjection to a weight force in this context means that the force of the weight of the respective valve closure body acts in the direction of its closed position. This is an advantageous implementation with regard to function and design for the valve closure bodies or valve closure units. In alternative embodiments, no elastic restoring force is provided for the valve closure bodies in the direction of their closed position, which can be an advantage for certain applications in which such a restoring force in the closing direction has no utility, either functionally or with regard to low implementation cost.

In a further development of the disclosure, the inlet area comprises a one-piece inlet chamber through which the valve closure bodies are subjectable to fluid pressure. In this embodiment, an essentially even fluid pressure acts on the different valve closure bodies during operation on the inlet chamber side. This is an advantageous implementation with regard to function and design for the valve closure bodies or valve closure units for the inlet area. In alternative embodiments, the inlet area can comprise a single, associated inlet chamber for each valve closure body, for example.

In a further development of the disclosure, the first valve closure body and/or the second valve closure body faces the inlet area with a pressure contact surface on an inlet side and faces the counter pressure chamber with a pressure contact surface on a counter pressure side, the pressure contact surface on the counter pressure side being smaller than the pressure contact surface on the inlet side. In this embodiment, assuming an identical fluid pressure in the inlet area and in the counter pressure chamber, the force on the respective valve closure body resulting from the fluid pressure in the inlet area is greater than the force resulting from the fluid pressure in the counter pressure chamber. This is an advantageous implementation with regard to function and design for the valve closure bodies or valve closure units where the fluid pressure can pre-tension the respective valve closure body in the direction of the counter pressure chamber during operation. In alternative embodiments, the respective valve closure body has a larger pressure contact surface on the counter pressure side compared to the pressure contact surface on the inlet side, which can be a benefit for corresponding applications.

BRIEF DESCRIPTION OF THE DRAWINGS

A detailed description of the drawings particularly refers to the accompanying figures in which.

DETAILED DESCRIPTION OF THE DRAWINGS

Figure 1:
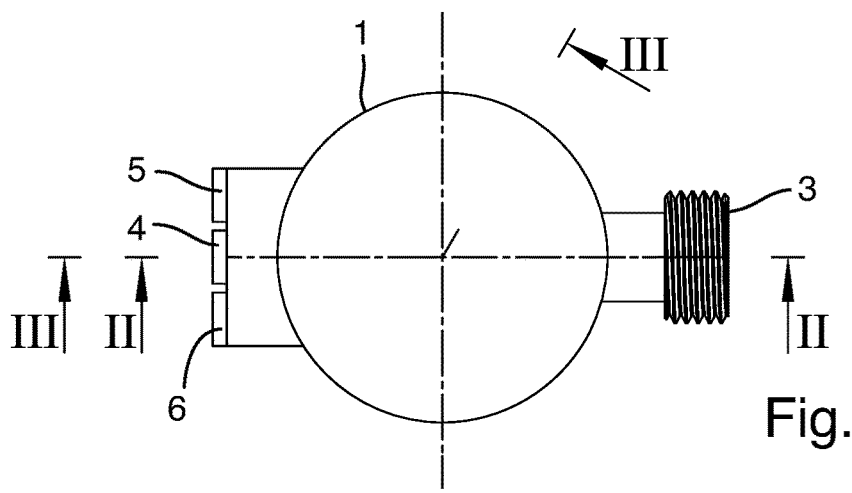
FIG. 1 is a top view from above of a fluid switching valve with an inlet and three outlets.

The embodiments of the invention described herein are not intended to be exhaustive or to limit the invention to the precise forms disclosed. Rather, the embodiments selected for description have been chosen to enable one skilled in the art to practice the invention.

As illustrated in the figures by way of a few exemplary embodiments, the fluid switching valve according to the invention includes a valve housing 1, an inlet area 2 having an inlet 3 into the valve housing 1, a first outlet 4 out of the valve housing 1, a second outlet 5 out of the valve housing 1, a counter pressure chamber 7, a first valve unit 8, a second valve unit 9 and a user-operable switching body 11.

In corresponding embodiments, the fluid switching valve, as in the exemplary embodiments shown, has an additional third outlet 6 out of the valve housing 1 and correspondingly a third valve unit 10. All three valve units 8, 9, and 10 are of identical design in the case shown. In the process, the three outlets 4, 5 and 6, as shown in the exemplary embodiments, can exit the valve housing 1 in a same direction, for example as shown in a direction opposite to the direction of the inlet 3, or alternatively in another direction, or they can alternatively exit in two or three different directions, for example offset from one another by 90° at the valve housing 1.

A first fluid connection 12 leads from the inlet area 2 to the first outlet 4. A second fluid connection 13 leads from the inlet area 2 to the second outlet 5. In the exemplary embodiments shown, a third fluid connection 14 leads from the inlet area 2 to the third outlet 6.

The inlet area 2 is fluid-connected to the counter pressure chamber 7 via an inlet link duct 15. The inlet link duct 15 is permanently open in the examples shown, so that the counter pressure chamber 7 remains in active, i.e., uninterrupted, fluid connection with the inlet area 2 during operation.

The first valve unit 8 comprises a valve closure body 16 which is movable between a closed position S and an open position O for the first fluid connection 12 and is arranged so as to be subjectable to fluid pressure on the one hand via the inlet area 2 and on the other hand via the counter pressure chamber 7. The second valve unit 9 comprises a second valve closure body 17 which is movable between a closed position S and an open position O for the second fluid connection 13 and is arranged so as to be subjectable to fluid pressure on the one hand via the inlet area 2 and on the other hand via the counter pressure chamber 7. Analogously, the third valve unit 10 comprises a third valve closure body 18 which is movable between a closed position and an open position for the third fluid connection 14 and is arranged so as to be subjectable to fluid pressure on the one hand via the inlet area 2 and on the other hand via the counter pressure chamber 7.

The valve closure bodies 16, 17, 18 are preferably of identical design, for example as cylindrical or tubular components functioning as valve pistons as shown in the examples, for example. In the process, the valve closure bodies 16, 17, 18 are preferably formed of a rigid, non-elastic plastic or metal material.

The purpose of the user-operable switching body 11 is to switch each of the valve closure bodies 16, 17, 18 between their closed position S and their open position O, the switching body 11 being switchable between different operating positions via a switching motion. In the exemplary embodiments shown, the switching body 11 is switchable between three different operating positions, wherein depending on the operating position, it is always the case that only one of the three valve closure bodies 16, 17, 18 is in its open position O while the other two are in their closed position S.

The counter pressure chamber 7 is fluid-connected to the first outlet 4 via a first outlet link duct 19, to the second outlet 5 via a second outlet link duct 20 and to the third outlet 6 via a third outlet link duct not seen in the figures.

Figure 2:
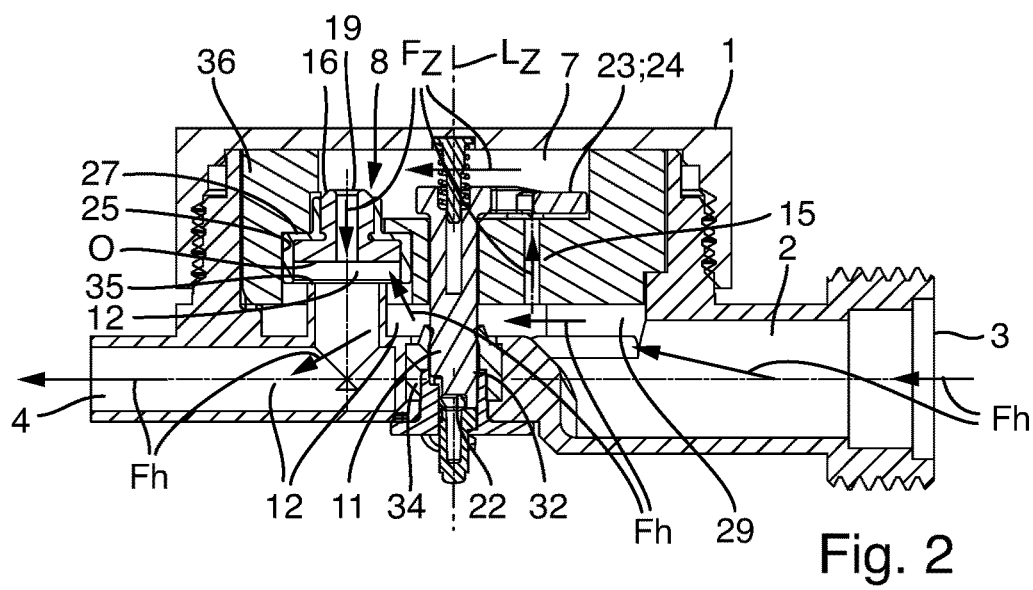
FIG. 2 is a sectional view along a line II-II of FIG. 1 with the valve in an operating state with the first outlet opened.
Figure 3:
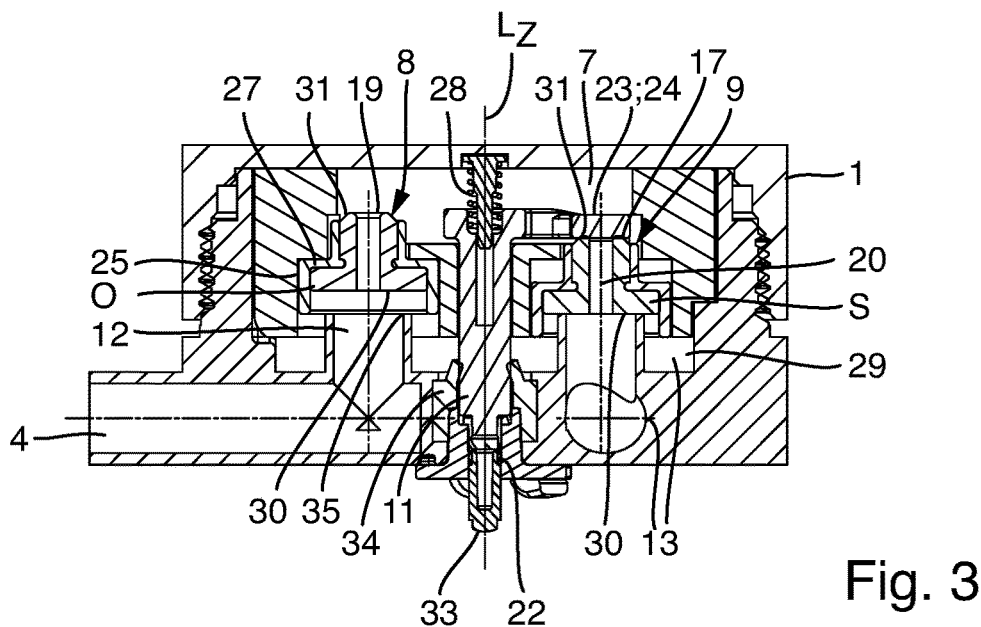
FIG. 3 is a sectional view along a line of FIG. 1.
Figure 4:
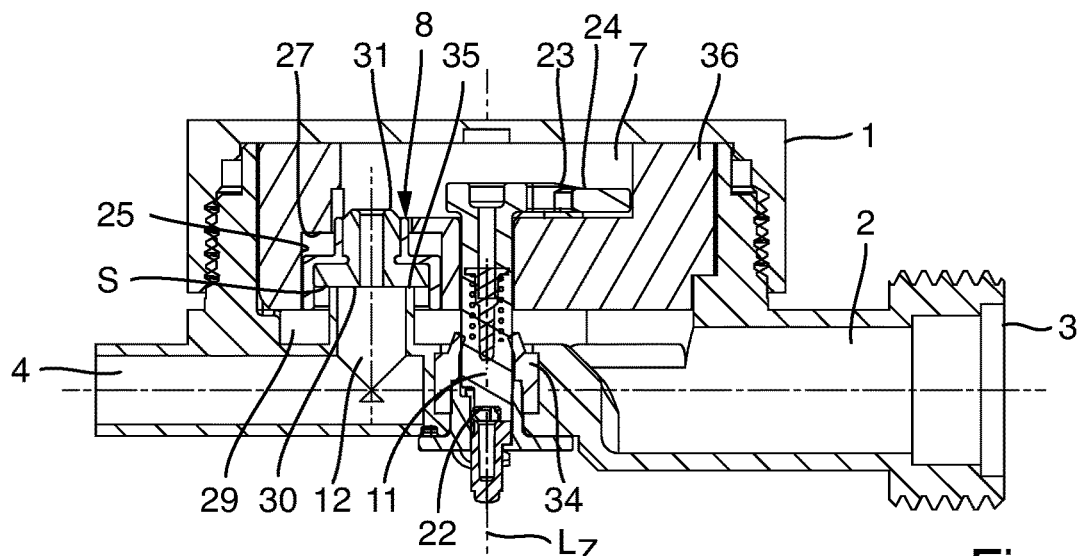
FIG. 4 is the sectional view of FIG. 2 for a variant of the fluid switching valve without a switching compression spring and with the first outlet closed.
Figure 5:
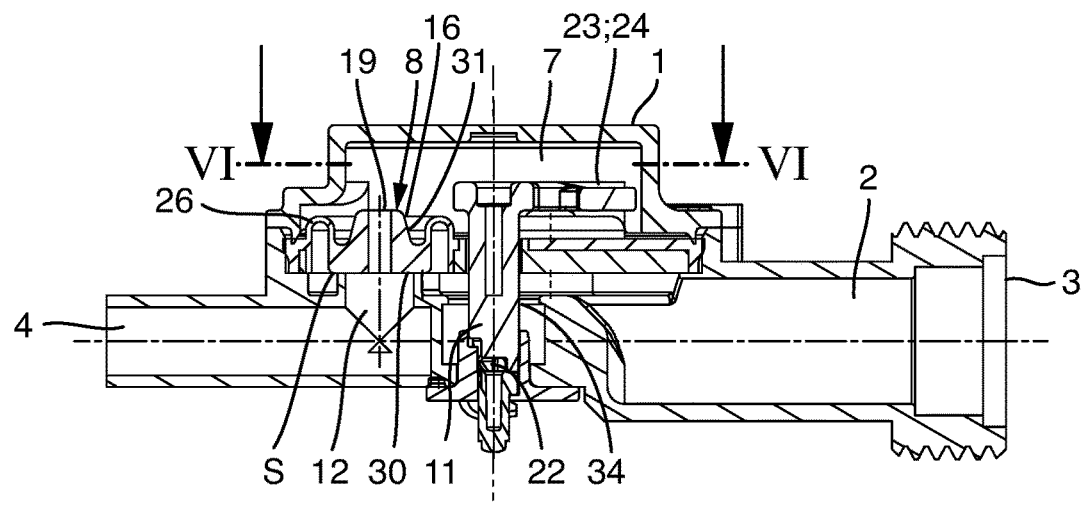
FIG. 5 is the sectional view of FIG. 2 for a variant of the fluid switching valve with valve closure bodies held by membranes and with the first outlet closed.
Figure 6:
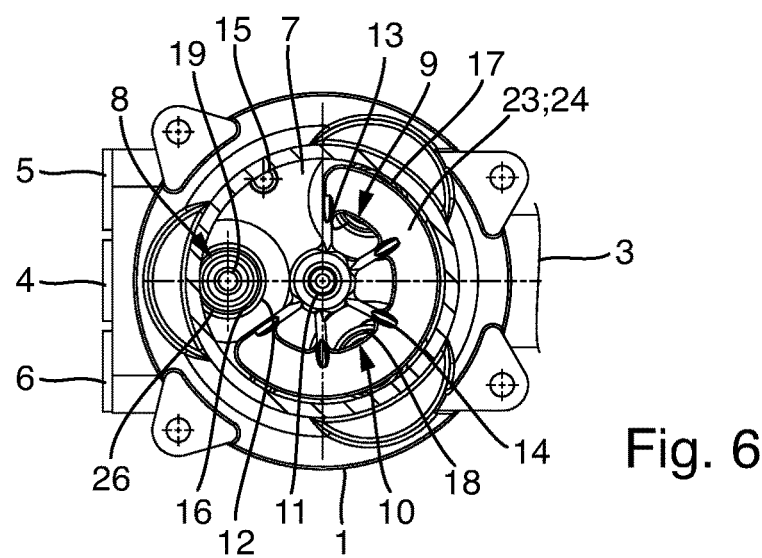
FIG. 6 is a sectional view along a line VI-VI of FIG. 5.

In a first operating position, the switching body 11 releases the first valve closure body 16, as can be seen in FIGS. 2 to 6, and holds the second valve closure body 17 in its closed position S as can be seen in FIGS. 3 and 6. In the embodiments shown, in its first operating position the switching body 11 also holds the third valve closure body 18 in its closed position S as can be seen in FIG. 6. Consequently, in the first operating position, only the first valve closure body 16 is in its open position O and thus only the first fluid connection 12 is opened.

In a second operating position, the switching body 11 releases the second valve closure body 17 and holds the first valve closure body 16 in its closed position S. In the examples shown, the switching body 11 also holds the third valve closure body 18 in its closed position S in a second operating position.

In the exemplary embodiments shown, in its third operating position the switching body 11 releases the third valve closure body 18 and holds the first and the second valve closure bodies 16 and 17 in their closed position S.

In the examples shown, the valve closure bodies 16, 17, 18 are designed to be cylindrical/tubular. In alternative embodiments, the valve closure bodies have another form, for example a disk shape.

In advantageous embodiments, the switching motion of the switching body 11 includes an axial motion and a rotary motion as in the examples shown. As in the implementations shown, for example, the axial motion is done parallel to a longitudinal axis Lz of the switching body 11 in both opposing directions as a corresponding lifting and lowering motion, respectively. The rotary motion of the switching body 11 is done about an axis of rotation which in the implementations shown is given to be the longitudinal axis Lz of the switching body 11. Alternatively, the axis of rotation is offset parallel to the longitudinal axis Lz of the switching body 11 or is oriented non-parallel to the same. In the embodiments shown, the first, the second and the third operating position correspond to a respective specific rotational position of the switching body 11, wherein the different rotational positions of the switching body 11 are each offset by 120°.

In one advantageous embodiment design, as shown in the examples, the switching body 11 can be further switched cyclically from one to a next of the different operating positions using a forward switching arrangement 22. With the aid of the forward switching arrangement 22, in the exemplary embodiments shown the rotary motion of the switching body 11 occurs as a cyclical forward switching in one direction only, for example in the counterclockwise sense or in the clockwise sense.

For this purpose, in the exemplary embodiments shown, the switching body 11 comprises a pressure pin 32 which runs from counter pressure chamber 7 through the inlet area 2 and out of the valve housing 1 along the longitudinal axis Lz of the switching body 11, alternatively parallel or non-parallel thereto, the pin being held in the valve housing 1 axially movably along its direction of extension, i.e., along its longitudinal axis, and also rotationally movably about its longitudinal axis. A pin penetration seal 34 surrounding the pressure pin 32 like a sleeve seals the inlet area 2 from the outside and the valve housing 1 in the area of the pin's penetration and permits the axial lifting and lowering motion of the pressure pin 32 and thereby that of the switching body 11 to occur. The pressure pin 32 ends on the outside with a pressure actuating unit 33 which cooperates with the forward switching arrangement 22. The forward switching arrangement 22 can be of any desired conventional design suitable for this purpose, there being no need for further explanation in this regard, for example it can be a forward switching arrangement of the type based on a ball-point pen switching principle, as is known to a person skilled in the art for such switching purposes for sanitary fluid switching valves. For example, the switching mechanism of the forward switching arrangement 22 can be implemented in a conventional manner in that the switching body 11 is first lifted off of the valve closure bodies 16, 17, 18 when the user actuates the pressure actuating unit 33 by axially pressing it, and is then moved in the direction toward the next possible position due to the interaction of slide tracks or inclined surfaces, said motion corresponding to a rotary motion of 120° in the embodiments shown, in order then to lower back down axially onto the valve closure bodies 16, 17, 18 during or after the rotary motion.

Alternatively, a conventional switching device of another kind having the same switching function is used, for example a type having a rotationally moving control element instead of the axially moving control element explained above having the pressure pin 32 and the pressure actuating unit 33.

In an advantageous implementation, the switching body 11 blocks off the second outlet link duct 20 in the first operating position. In the examples shown, the switching body 11 also blocks off the third outlet link duct in this operating position. The first outlet link duct 19 remains open.

In an advantageous implementation, the switching body 11 blocks the first outlet link duct 19 in the second operating position, and also blocks off the third outlet link duct in the examples shown. The second outlet link duct 19 remains open.

In the exemplary embodiments shown, as already indicated, the switching body 11 can be switched to the third operating position. In this position, the switching body 11 blocks off the first and the second outlet link ducts 19 and 20, whereas the third outlet link duct remains open.

In advantageous embodiments, as in the examples shown, the different operating positions correspond to different rotational angle positions of the switching body 11. In the process, as in the examples shown, the valve closure bodies 16, 17, 18 can be arranged evenly distributed along a circle about the axis of rotation, i.e., the longitudinal axis Lz of the switching body 11, which is to say evenly spaced out relative to one another in the peripheral direction as can be seen in FIG. 6. This is a beneficial design prerequisite to ensure that the switching body 11, as indicated, can act on at least one of the valve closure bodies depending on the rotational angle position, and can release the remaining valve closure body or bodies. In addition, this arrangement favors a compact design, for example for the cylindrical valve housing 1 shown. In the process, it is preferable for the valve closure bodies 16, 17, 18 to be disposed at the same axial height in the valve housing 1.

In advantageous embodiments, the counter pressure chamber 7, as in the exemplary embodiments shown, is designed as a single part, i.e., it forms a single integral chamber space. In alternative embodiments, the counter pressure chamber 7 can consist of a plurality of individual chambers, each with its own chamber space.

In a beneficial embodiment design, as in the examples shown, the switching body 11 comprises a switching member 23 which is movably disposed in the one-piece counter pressure chamber 7. In the exemplary embodiments shown, the switching member 23 acts on two different valve closure bodies out of the three valve closure bodies 16, 17, 18, depending on the operating position, and releases the remaining valve closure body, and is fixedly connected to the pressure pin 32. Due to its one-piece design, the counter pressure chamber 7 has enough space to accommodate and move the switching member 23 without the need to seriously limit the size of the same, which is not desirable.

In an advantageous implementation, the switching body 11, as in the examples shown, contains a switching disk 24 which is axially and rotationally movable in the one-piece counter pressure chamber 7, the switching disk assuming different rotary positions in the different operating positions of the switching body 11 and also acting on the valve closure bodies 16, 17, 18. In the examples shown, the switching disk 24 has the shape of a circle sector having an angular extent of approximately 240° as can be seen in FIG. 6, and is rigidly connected to the pressure pin 32 which extends perpendicular to the disk plane of switching disk 24.

In advantageous embodiments, as in the examples shown, the first outlet link duct 19 is provided in the first valve closure body 16, and the second outlet link duct 20 is provided in the second valve closure body 17. In addition, in the examples shown the third outlet link duct is provided in the third valve closure body 18. What is special in the examples shown is that the respective outlet link duct 19, 20 is made in the piston-shaped valve closure bodies 16, 17, 18 as central longitudinal holes, respectively. This makes it possible, in an uncomplicated way, to not only allow the switching body 11 to act on the respective valve closure body 16, 17, 18 so that it can be held in its closed position S, but also to block off or seal off the outlet link duct 19 and 20 of its respective closure body.

In an advantageous embodiment design, the first and/or the second valve closure body 16, 17 is guided in a respective receptacle 25 axially movably. In the examples shown in FIGS. 1 to 4, both valve closure bodies 16, 17, and in addition the third valve closure body 18, are guided in an associated receptacle 25 axially movably. This can, e.g., be implemented, as shown, by providing the valve housing 1 with a housing member 36 that separates the inlet area 2 and the counter pressure chamber 7 from one another, the respective receptacles 25 being formed in said housing member. The inlet link duct 15 is also provided in this housing member 36 as a through hole through which the inlet area 2 is fluid-connected to the counter pressure chamber 7 as can be seen in FIG. 2. The receptacles 25 each have a shape matching the valve closure bodies 16, 17, 18 that are received there, in other words in the exemplary embodiments shown, with the piston-shaped valve closure bodies 16, 17, 18 the receptacles 25 are cylindrical and designed as blind bores.

In an alternative advantageous implementation, the first and/or the second valve closure body 16, 17 is held axially movably by a holding membrane 26. In the examples shown in FIGS. 5 and 6, both valve closure bodies 16 and 17, and in addition the third valve closure body 18, are held axially movably by a respective holding membrane 26. Preferably, the respective valve closure body 16, 17, 18 can be manufactured together with its holding membrane 26 as a two-component assembly in which the rigid, non-elastic valve closure body 16, 17, 18 is manufactured integrally with the flexible holding membrane 26 or is connected thereto.

In the implementations mentioned in which the valve closure bodies 16, 17, 18 are disposed axially movably, their axial movement may be parallel to the axial movement of the switching body 11 as shown in the examples. In alternative embodiments, the valve closure bodies 16, 17, 18 move axially non-parallel to the switching body 11.

In advantageous embodiments, at least one of the valve closure bodies 16, 17, 18 is axially bounded in its open position O by an associated stop 27, wherein the stop limit is preferred to be such that relatively small axial switching stroke lengths can be implemented for the switching body 11. In the designs of the examples shown in FIGS. 2 to 4, this limiting can allow the axial travel of the valve closure bodies 16, 17, 18 from their closed position S to their open position O to be kept suitably shorter than the axial switching length, i.e., stroke length, of the switching body 11. For example, it can be possible to limit the axial travel of the valve closure bodies 16, 17, 18 to only about 1.8 mm to 2.2 mm, and the axial switching or stroke length of the switching body 11 to be only about 2 mm to 4 mm.

In advantageous embodiments, as in the examples shown, the first and/or the second valve closure body 16, 17 is subjected to a spring force acting in the direction of its closed position S. Especially in the examples shown in FIGS. 1 to 3, the first and the second, and in addition the third valve closure body 18 is subjected to a spring force acting in the direction of its closed position S. In this embodiment as shown, for the purposes of imposing a spring force the fluid switching valve comprises a switching spring 28 inside the valve housing 1, for example in the form of a helical compression spring disposed in the counter pressure chamber 7 as shown, alternatively in the form of a tension spring or another conventional elastic element. Thus, each valve closure body on which the switching body 11 acts in its current operating position is elastically pre-tensioned into the closed position S of the closure body regardless of the fluid pressure or pressure difference in effect or of the spatial positional orientation of the valve housing 1. In the examples shown, the force of weight of the valve closure bodies 16, 17, 18 acts on the valve closure bodies 16, 17, 18 in the direction of their closed positions S as an alternative to or in addition to the aforementioned spring force when the valve housing 1 is in a corresponding positional orientation, as is the case with its horizontal orientation combined with the upward-directed vertical direction seen in FIGS. 2 to 5, in other words the valve closure bodies 16, 17, 18 are in this case subjected to the force of weight in the direction of their closed positions S.

In an advantageous embodiment design, the inlet area 2, as in the examples shown, comprises a one-piece inlet chamber 29, i.e., the inlet chamber 29 forms a single, integral inlet chamber space. The valve closure bodies 16, 17, 18 are commonly subjectable to fluid pressure via this one-piece inlet chamber 29. In the exemplary embodiments shown, the inlet chamber 29 is situated opposite to the counter pressure chamber 7 relative to the valve closure bodies 16, 17, 18.

In an advantageous implementation, the first and/or the second valve closure body 16, 17 faces the inlet area 2 with a pressure contact surface 30 on an inlet side and faces the counter pressure chamber 7 with a pressure contact surface 31 on a counter pressure side. Especially in the examples shown, each of the first and/or the second valve closure body 16, 17, and additional the third valve closure body 18, faces the inlet area 2 with a respective pressure contact surface 30 on an inlet side, and faces the counter pressure chamber 7 with a pressure contact surface 31 on a counter pressure side. In the process, the pressure contact surface 31 on the counter pressure side and the pressure contact surface 30 on the inlet side are designed to be annular, the pressure contact surface 31 on the counter pressure side being smaller than the pressure contact surface 30 on the inlet side. As a consequence of this, when the fluid pressures in the inlet area 2 on the one hand and in the counter pressure chamber 7 on the other hand are equal, the pressure force resulting from the fluid pressure in the inlet area 2 and acting on the respective valve closure body 16, 17, 18 is higher than the pressure force acting in the opposite direction resulting from the fluid pressure in the counter pressure chamber 7 and acting on the respective valve closure body 16, 17, 18. In this way, when the pressure in valve housing 1 is constant, the valve closure bodies 16, 17, 18 are pushed in the direction of their open position O during operation, in other words the fluid pressure pre-stresses the valve closure bodies 16, 17, 18 to their open position O.

The functionality of the switching valve is explained in more detail below, wherein the three valve units 8, 9, 10 operate identically due to their identical design, so that it is sufficient to provide details on the first valve unit 8 as an exemplar of the functionality, for example. For this explanation of the functionality, in FIG. 2 the valve is shown in an active operating situation, with the associated fluid flow shown represented by flow arrows.

The respective valve closure body 16, 17, 18 is in its closed position S on an associated valve seat 35 as shown in FIGS. 4 and 5 for the first valve closure body 16 of the first valve unit 8, the valve closure body 16, 17, 18 thereby sealing or blocking off its associated fluid connection 12, 13, 14 and thus the inlet area 2 relative to the associated outlet 4, 5, 6. In the open position O of the respective valve unit 8, 9, 10, the associated valve closure body 16, 17, 18 is at a distance away from, i.e., is lifted off of its valve seat 35. The valve seats 35 can, as shown, be formed by ends of a respective pipe stub against which an end surface of the respective piston-shaped valve closure body 16, 17, 18 can sit in a sealing manner, the valve closure bodies 16, 17, 18 in the examples shown having a broader T-shaped top area for this purpose. The valve seats 35 can, for example, lie in a common transverse plane in the valve housing 1 as in the valve embodiments shown.

In the examples shown, the respective valve closure body 16, 17, 18 lifts off of its valve seat 35 during operation due to the pressure difference of the fluid pressure acting on the closure body from the inlet area 2 minus the lower fluid pressure acting on the closure body from the counter pressure chamber 7 in the opposite direction, and minus the weight force acting on the closure body in the closing direction S. This then opens the respective fluid connection 12, 13, 14 from the inlet area 2 to the associated outlet, and fluid can correspondingly flow directly from the inlet area 2 to this outlet as can be seen in FIG. 2 for the first outlet 4 and symbolized by flow arrows Fh. In addition, in the examples shown there is also an indirect fluid connection from the inlet area 2 through the inlet link duct 15, the counter pressure chamber 7 and the associated outlet link duct 19, 20, 21, as is illustrated in FIG. 2 for the first valve unit 8. In general, however, any additional fluid flow which results through this indirect fluid connection, as indicated in FIG. 2 with flow arrows Fz, is, however, in general at most quite low due to the fluid pressure relationships in effect.

Without any limiting of generality, the operating situation according to FIG. 2 is taken to be a first operating position of the fluid switching valve, and the position of the switching body 11 shown there and in FIGS. 3 to 6 is taken to be that of its first operating position. In this first operating position, the switching body 11 releases the first valve closure body 16 so that the latter assumes its open position O, causing the first fluid connection 12 to be opened and the fluid to flow from the inlet 3, i.e., the inlet area 2, both directly as well as indirectly through the inlet link duct 15, the counter pressure chamber 7 and the first outlet link duct 19 to the first outlet 4. At the same time, the switching body 11, in particular the switching disk 24, holds the second valve closure body 17 and the third valve closure body 18 in the closed position S, respectively. In the process the switching body 11 or switching disk 24 also seals off the respective second and third outlet link duct 20, 21. This means that both the second fluid connection 13 as well as the third fluid connection 14, as well as the two associated indirect fluid connections through the inlet link duct 15, the counter pressure chamber 7 and the second or third outlet link duct 20, 21 are blocked off. No fluid passes to the corresponding second and third outlet 5, 6 from the inlet area 2 or from the counter pressure chamber 7.

When the user actuates the pressure actuating unit 33 of the switching body 11 and thereby moves the pressure pin 32 axially upward in FIGS. 2 to 5, the switching body 11 or switching disk 24 is axially raised and the two valve closure bodies 17, 18, which up until that point had been pushed down by it, follow this axial raising movement in the direction of the open position O due to their pre-tension under fluid pressure, in other words due to the pressure difference of the fluid from the inlet area 2 and the inlet chamber 29 on the one hand and from the counter pressure chamber 7 on the other hand. This also causes the two blocked-off fluid connections 13, 14 to open as well during the moment of switching. This can contribute to a fluid pressure relief in the counter pressure chamber 7, and consequently help to keep the actuation force that needs to be applied by the user relatively low for the valve switching. Fluid can flow out of the counter pressure chamber 7 through the outlet link duct 19 of the valve closure body 16 which is located in its open position O and has not been pushed down, which keeps the fluid pressure in the counter pressure chamber 7 low, thereby also making it easier to axially lift the switching body 11, and primarily also the valve closure bodies 17, 18, which were pushed down up until then. If the switching body 11 is sitting against the housing member 36 in its initial position in an axially sealing manner, the fluid pressure in the counter pressure chamber 7 initially acts against the lifting movement of the switching body 11. However, this pressure effect subsides immediately as soon as the switching body 11 is raised slightly since then the fluid pressure can also act on the switching body 11 in the direction of lifting from the other side as well.

When the valve closure bodies 17, 18 which were pushed down up until then have reached their axial end position, for example as defined by the stop 27 and/or the holding membrane 26, in other words when they have reached their fully open position O, further axial lifting of the switching body 11 results in the outlet link ducts 20, 21 of the two valve closure bodies 17, 18 which were held down up until then now also opening, which allows fluid to flow more easily and faster out of the counter pressure chamber 7.

As soon as the switching body 11 has been raised to its axial end position and the user has released the pressure pin 32 and the pressure actuating unit 33 again, the switching body 11 lowers back down, supported by the switching spring 28 and also by the weight force of the switching body 11, depending on the positional orientation of the valve. The switching body 11 first lowers just until it has reached the axial end position of the valve closure bodies 16, 17, 18.

The rotating mechanism mentioned, for example the slide mechanism, of the forward switching arrangement 22 makes sure that the switching body 11 rotates, for example clockwise, by the desired 120° until it reaches the height of the valve closure bodies 16, 17, 18 as it makes its axial lifting movement and/or in its axial end position and/or during its initial lowering movement, whereupon it now sits against the first valve closure body 16 and the third valve closure body 18, and as it further lowers it takes these two valve closure bodies 16, 18 along with it and moves them to their closed position S and holds them there. The second valve closure body 17 is no longer acted upon by the switching body 11 and remains in the open position O. The switching body 11 is now located in its second operating position in which it consequently causes the first fluid connection 12 and the third fluid connection 14 to be blocked off by the respective valve units 8, 10, whereas the second fluid connection 13 is held open by the second valve unit 9. Accordingly, the fluid then flows from the inlet 3, i.e., from the inlet area 2, through the second fluid connection 13 and the second outlet link duct 20 to outlet 5 and out from it.

The next and all further switchings of the valve are done similar to the switching just explained, wherein the switching body always rotates in the same direction by 120° each time thanks to the cyclical forward switching arrangement 22. This causes the switching body to release the third valve closure body 18 to its open position O after the next switching to its third operating position, and to hold the first and the second valve closure bodies 16, 17 pushed down to their closed position S. Upon subsequent switching, the switching body 11 then reaches its first operating position again in the examples shown, in other words the valve is again located in the position assumed to be its initial position.

As the exemplary embodiments shown and those further mentioned above make clear, the invention provides a fluid switching valve which provides advantages, in particular with regard to functionality, design and/or operating reliability in comparison to conventional fluid switching valves. In particular, the fluid switching valve according to the invention makes it possible for the user to perform comfortable switching, requiring only low switching forces to be applied and short switching lengths of the valve components. Due to its design and mode of action, the valve is less prone to failure, and it can be designed to be very compact, as necessary.

Of course, the fluid switching valve is suitable not only for sanitary applications, such as in sanitary showers or kitchen sprays, but also for non-sanitary shower applications, such as in the chemical process technology and in petroleum processing industry for correspondingly controlling the feeding and distributing a fluid or gaseous fluid.

Although the invention has been described in detail with reference to certain preferred embodiments, variations and modifications exist within the spirt and scope of the invention as described and defined in the following claims.

The invention claimed is:

1. A fluid switching valve, comprising
a valve housing;
an inlet area having an inlet into the valve housing;
a first and a second outlet out of the valve housing;
a first fluid connection from the inlet area to the first outlet and a second fluid connection from the inlet area to the second outlet;
a counter pressure chamber, which is fluid-connected through an inlet link duct to the inlet area;
a first valve unit comprising a first valve closure body which is movable between a closed position and an open position for the first fluid connection, and is arranged so as to be subjectable to fluid pressure on the one hand via the inlet area and on the other hand via the counter pressure chamber;
a second valve unit comprising a second valve closure body which is movable between a closed position and an open position for the second fluid connection, and is arranged so as to be subjectable to fluid pressure on the one hand via the inlet area and on the other hand via the counter pressure chamber; and
a user-operable switching body for switching the valve closure bodies between their closed position and their open position, the switching body being switchable between different operating positions by a switching movement;
wherein:
the switching body in a first operating position releases the first valve closure body and holds the second valve closure body in its closed position, and in a second operating position holds the first valve closure body in its closed position and releases the second valve closure body; and
wherein:
the counter pressure chamber is a single chamber which is fluid-connected through a first blockable outlet link duct to the first outlet and through a second blockable outlet link duct to the second outlet; or
the switching body, in the first operating position, releases the first valve closure body and abuttingly engages and thereby holds the second valve closure body in its closed position, and, in the second operating position, releases the second valve closure body and abuttingly engages and thereby holds the first valve closure body in its closed position.

2. The fluid switching valve according to claim 1, wherein the switching body is cyclically switchable by a forward switching arrangement from any of the different operating positions to a next one.

3. The fluid switching valve according to claim 2, wherein the switching body comprises a switching member which is positioned movably in the counter pressure chamber and acts on the first and on the second valve closure bodies.

4. The fluid switching valve according to claim 3, wherein the switching member comprises a switching disk which is axially and rotationally movable in the counter pressure chamber and assumes different rotational positions in the different operating positions and acts axially on the valve closure bodies.

5. The fluid switching valve according to claim 1, wherein the switching body in the first operating position blocks the second outlet link duct.

6. The fluid switching valve according to claim 1, wherein the switching body in the second operating position blocks the first outlet link duct.

7. The fluid switching valve according to claim 1, wherein the different operating positions correspond to different rotation angle positions of the switching body.

8. The fluid switching valve according to claim 1, wherein the counter pressure chamber is formed as a single piece.

9. The fluid switching valve according to claim 1, wherein the first valve closure body is guided axially movably in a receptacle or is held axially movably by a holding membrane.

10. The fluid switching valve according to claim 1, wherein the second valve closure body is guided axially movably in a receptacle or is held axially movably by a holding membrane.

11. The fluid switching valve according to claim 1, wherein the first valve closure body is bounded axially in its open position by a stop.

12. The fluid switching valve according to claim 1, wherein the second valve closure body is bounded axially in its open position by a stop.

13. The fluid switching valve according to claim 1, wherein at least one of the first and the second valve closure body is subjected to a spring force in the direction of its closed position.

14. The fluid switching valve according to claim 1, wherein at least one of the first and the second valve closure body is subjected to a weight force in the direction of its closed position.

15. The fluid switching valve according to claim 1, wherein the inlet area includes a one-piece inlet chamber, through which the valve closure bodies are fluid-pressurizable.

16. The fluid switching valve according to claim 1, wherein at least one of the first valve closure body and the second valve closure body faces the inlet area with a pressure contact surface on an inlet side, and faces the counter pressure chamber with a pressure contact surface on a counter pressure side, which pressure contact surface on a counter pressure side is smaller than the pressure contact surface on the inlet side.

17. The fluid switching valve according to claim 1, wherein it is a sanitary switching valve.

18. The fluid switching valve according to claim 1, wherein the counter pressure chamber is a single chamber which is fluid-connected through a first blockable outlet link duct to the first outlet and through a second blockable outlet link duct to the second outlet.

19. The fluid switching valve according to claim 1, wherein the switching body, in a first operating position, releases the first valve closure body and abuttingly engages and thereby holds the second valve closure body in its closed position, and, in a second operating position, releases the second valve closure body and abuttingly engages and thereby holds the first valve closure body in its closed position.

20. A fluid switching valve, comprising
a valve housing;
an inlet area having an inlet into the valve housing;
a first and a second outlet out of the valve housing;
a first fluid connection from the inlet area to the first outlet and a second fluid connection from the inlet area to the second outlet;
a counter pressure chamber, which is fluid-connected through an inlet link duct to the inlet area;
a first valve unit comprising a first valve closure body which is movable between a closed position and an open position for the first fluid connection, and is arranged so as to be subjectable to fluid pressure on the one hand via the inlet area and on the other hand via the counter pressure chamber;
a second valve unit comprising a second valve closure body which is movable between a closed position and an open position for the second fluid connection, and is arranged so as to be subjectable to fluid pressure on the one hand via the inlet area and on the other hand via the counter pressure chamber; and
a user-operable switching body for switching the valve closure bodies between their closed position and their open position, the switching body being switchable between different operating positions by a switching movement;
wherein:
the counter pressure chamber is fluid-connected through a first blockable outlet link duct to the first outlet and through a second blockable outlet link duct to the second outlet;
the switching body in a first operating position releases the first valve closure body and holds the second valve closure body in its closed position, and in a second operating position holds the first valve closure body in its closed position and releases the second valve closure body; and
the switching movement of the switching body includes an axial motion and a rotary motion.

21. A fluid switching valve, comprising
a valve housing;
an inlet area having an inlet into the valve housing;
a first and a second outlet out of the valve housing;
a first fluid connection from the inlet area to the first outlet and a second fluid connection from the inlet area to the second outlet;
a counter pressure chamber, which is fluid-connected through an inlet link duct to the inlet area;
a first valve unit comprising a first valve closure body which is movable between a closed position and an open position for the first fluid connection, and is arranged so as to be subjectable to fluid pressure on the one hand via the inlet area and on the other hand via the counter pressure chamber;
a second valve unit comprising a second valve closure body which is movable between a closed position and an open position for the second fluid connection, and is arranged so as to be subjectable to fluid pressure on the one hand via the inlet area and on the other hand via the counter pressure chamber; and
a user-operable switching body for switching the valve closure bodies between their closed position and their open position, the switching body being switchable between different operating positions by a switching movement;
wherein:
the counter pressure chamber is fluid-connected through a first blockable outlet link duct to the first outlet and through a second blockable outlet link duct to the second outlet;

the switching body in a first operating position releases the first valve closure body and holds the second valve closure body in its closed position, and in a second operating position holds the first valve closure body in its closed position and releases the second valve closure body; and wherein at least one of the first valve closure body and the second valve closure body is configured such that the first outlet link duct is provided in the first valve closure body, or, the second outlet link duct is provided in the second valve closure body.

* * * * *